United States Patent [19]

Ogasawara et al.

[11] Patent Number: 4,562,477
[45] Date of Patent: Dec. 31, 1985

[54] AUTOMATIC DIAPHRAGM CONTROL DEVICE FOR USE WITH CCTV CAMERA

[75] Inventors: Terumi Ogasawara; Masayuki Arai; Tohru Shikano, all of Tokyo, Japan

[73] Assignee: Asahi Seimitsu Kabushiki Kaisha, Tokyo, Japan

[21] Appl. No.: 651,077

[22] Filed: Sep. 17, 1984

[30] Foreign Application Priority Data

Sep. 26, 1983 [JP] Japan ................................ 58-177828

[51] Int. Cl.$^4$ ............................................. H04N 5/34
[52] U.S. Cl. .................................... 358/228; 352/141; 354/412; 358/210
[58] Field of Search ............... 358/228, 213, 209, 210, 358/906; 354/412, 423, 429, 442, 443; 352/141

[56] References Cited

U.S. PATENT DOCUMENTS

| | | | |
|---|---|---|---|
| 4,116,552 | 9/1978 | Wagensonner | 352/141 |
| 4,118,714 | 10/1978 | Okajima et al. | 354/31 |
| 4,174,526 | 11/1979 | Geurts | 358/219 |
| 4,192,588 | 3/1980 | Wagensonner et al. | 354/43 |
| 4,200,372 | 4/1980 | Iwama et al. | 354/43 |
| 4,208,110 | 6/1980 | Ito et al. | 354/31 |
| 4,288,150 | 9/1981 | Ishida | 354/230 |
| 4,300,167 | 11/1981 | Miller et al. | 358/210 |
| 4,324,464 | 4/1982 | Wick | 354/25 |
| 4,331,401 | 5/1982 | Numata | 354/37 |
| 4,366,501 | 12/1982 | Tsunekawa et al. | 358/310 |
| 4,399,466 | 8/1983 | Stephenson | 358/228 |
| 4,408,852 | 10/1983 | Yamasaki | 354/24 |
| 4,437,744 | 3/1984 | Terui et al. | 354/442 |
| 4,453,811 | 6/1984 | Yamasaki | 354/412 |

Primary Examiner—Thomas W. Brown
Assistant Examiner—Robert G. Lev
Attorney, Agent, or Firm—Birch, Stewart, Kolasch & Birch

[57] ABSTRACT

The present invention relates to an automatic diaphragm control device for use with a CCTV camera which has recently found many applications.

The present invention provides an automatic diaphragm control device for use with a CCTV camera adapted to provide an automatically diaphragm controllable lens system having a light measuring mode which can be continuously varied at will adjacently to or remotely from the camera objective depending on the condition of an object to be picked up and permitting a changeover to be easily achieved between an automatic diaphragm control mode and a remote diaphragm control mode, if desired, to meet needs of the CCTV system.

6 Claims, 10 Drawing Figures

AUTOMATIC DIAPHRAGM CONTROL DEVICE FOR USE WITH CCTV CAMERA

BACKGROUND OF THE INVENTION

The present invention relates to an automatic diaphragm control device for use with a CCTV camera which has recently found many applications.

In the case where a video signal supplied from a television camera is utilized for control of the objective diaphragm incorporated in this camera, one of the essential measures to obtain the optimum picture is a sensitivity adjustment to control absolute brightness of an object to be picked up. Light and shade ratio of different areas in the same object, i.e., contrast, is also the important factor to be considered. In the natural world, for example, the contrast lies within a range of tens:one even in cloudy daylight and within a range of hundreds:one in cloudless daylight. In the picture reproduced by a television, on the contrary, the contrast lies within a range as narrow as of 30 to 40:1. For a high contrast as in the natural world, therefore, it is not adequately useful to rely upon said sensitivity adjustment alone in order to obtain the optimum picture and it is necessary to control a proportion of the area in one and the same object corresponding to a bright portion of the video signal coming from the camera and to utilize this video signal as a diaphragm control signal. Also for the object, for example, in the natural world, in which not only the contrast but also the other factors continuously vary over a wide range, it is desired and has been seriously demanded that means for said control can be continuously regulated at will at a place adjacent to or remote from the camera objective to maintain the optimum picture.

It has also been demanded, in the CCTV system widely adopted in many fields for various applications, to develop a diaphragm control device for CCTV camera of high reliability permitting said automatic control means to be easily remote-manipulated, if desired, to make said system perfect. However, it will be impossible to achieve such diaphragm control for the CCTV camera of so many types with a high stability unless such diaphragm control can be stabilized within an adequately wide range of source voltage.

SUMMARY OF THE INVENTION

To resolve these problems as mentioned above, the present invention provides an automatic diaphragm control device for use with a CCTV camera adapted to provide an automatically diaphragm controllable lens system having a light measuring mode which can be continuously varied at will through a manipulation occurring adjacently to or remotely from the camera objective depending on the condition of an object to be picked up and permitting a changeover to be easily achieved between an automatic diaphragm control and a remote diaphragm control, if desired, to meet needs of the CCTV system.

DESCRIPTION OF THE EMBODIMENT

The present invention will be now described by reference to an embodiment as shown by the accompanying drawings.

Figure 1:
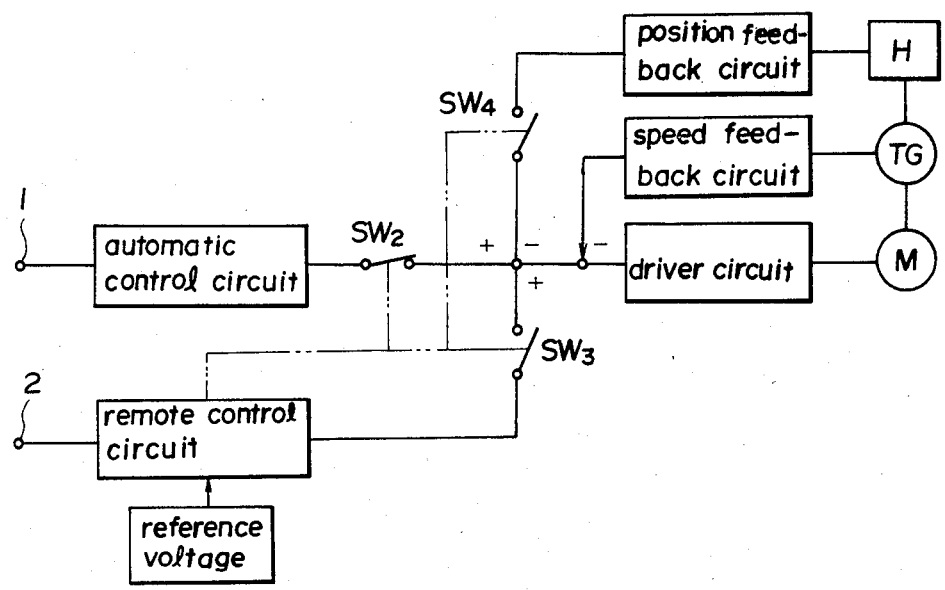
FIG. 1 is a block diagram illustrating a principle of the present invention.

FIG. 1 is a block diagram illustrating a principle of the present invention, in which reference numeral 1 designates a video signal input terminal adapted to be applied with a video signal coming from the television camera and reference numeral 2 designates a position control signal input terminal adapted to be applied with a diaphragm position control signal during the remote control. So far as no position control signal Vm higher than a predetermined reference voltage appears on the position control signal input terminal 2, a switch Sw2 remains ON but switches Sw3 and Sw4 remain OFF, so that only a video signal Vin applied to the video signal input terminal 1 is applied through an automatic control circuit to a driver circuit and thus a motor M is driven to achieve the automatic diaphragm control.

Upon application of the position control signal Vm higher than the reference voltage to the position control signal input terminal 2, the switch Sw2 is now turned OFF and the switches Sw3 and Sw4 are turned ON, resulting in that any signal from the automatic control circuit is intercepted and the position control signal Vm is applied from a remote control circuit to the driver circuit and thereby the diaphragm control is done in the remote control mode. Since the switch Sw4 is in conductive state at this point, a position detection signal from a position detector element H provides a position feedback so that the diaphragm may be electrically fixed.

In any cases, a tachogenerator TG provides a velocity feedback to brake the motor M and thereby to maintain a diaphragm velocity constant.

Figure 2:
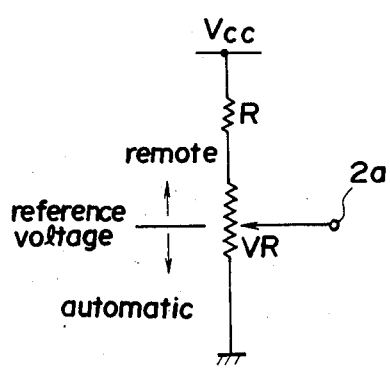
FIG. 2 is a diagram schematically illustrating means for the remote control by a single-wire control.
Figure 3:
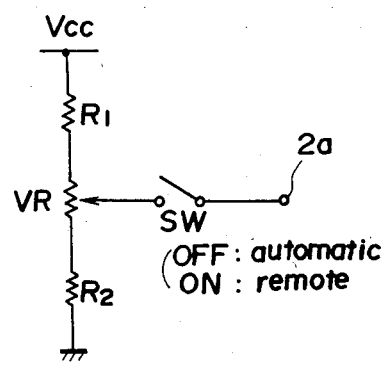
FIG. 3 is a diagram schematically illustrating the other means for the remote control by a single-wire control.

Means to operate the remote control circuit may be arranged as shown by FIGS. 2 and 3. In the case of FIG. 2, a variable resistance VR has its output terminal 2a being connected by a single wire to said position control signal input terminal 2 so that the output voltage can be adjusted to a level higher or lower than the predetermined reference voltage. Thus, the output voltage of the variable resistance VR lower than the reference voltage establishes the automatic control mode since no position control signal Vm is then applied to the position control signal input terminal 2 while said output voltage higher than the reference voltage establishes the remote control mode since the position control signal Vm is then applied to said input terminal 2. During the remote control mode, the control proceeds so that the diaphragm is opened as a voltage value of the variable resistance VR applied to the position control signal input terminal 2 increases and closed or stopped down as said voltage value decreases. In the case of FIG. 3, the variable resistance VR has its output voltage adjustable within a range higher than the reference voltage and there is provided between the output terminal 2a connected by the single wire to said position control signal input terminal 2 and said variable resistance VR a switch SW. With this switch being OFF, the automatic control mode is established and with this switch being ON, the position control signal Vm is applied to the position control signal input terminal 2 to regulate the resistance value of the variable resistance VR so that the diaphragm control may be achieved in the same manner as in the case of FIG. 2.

Figure 4:
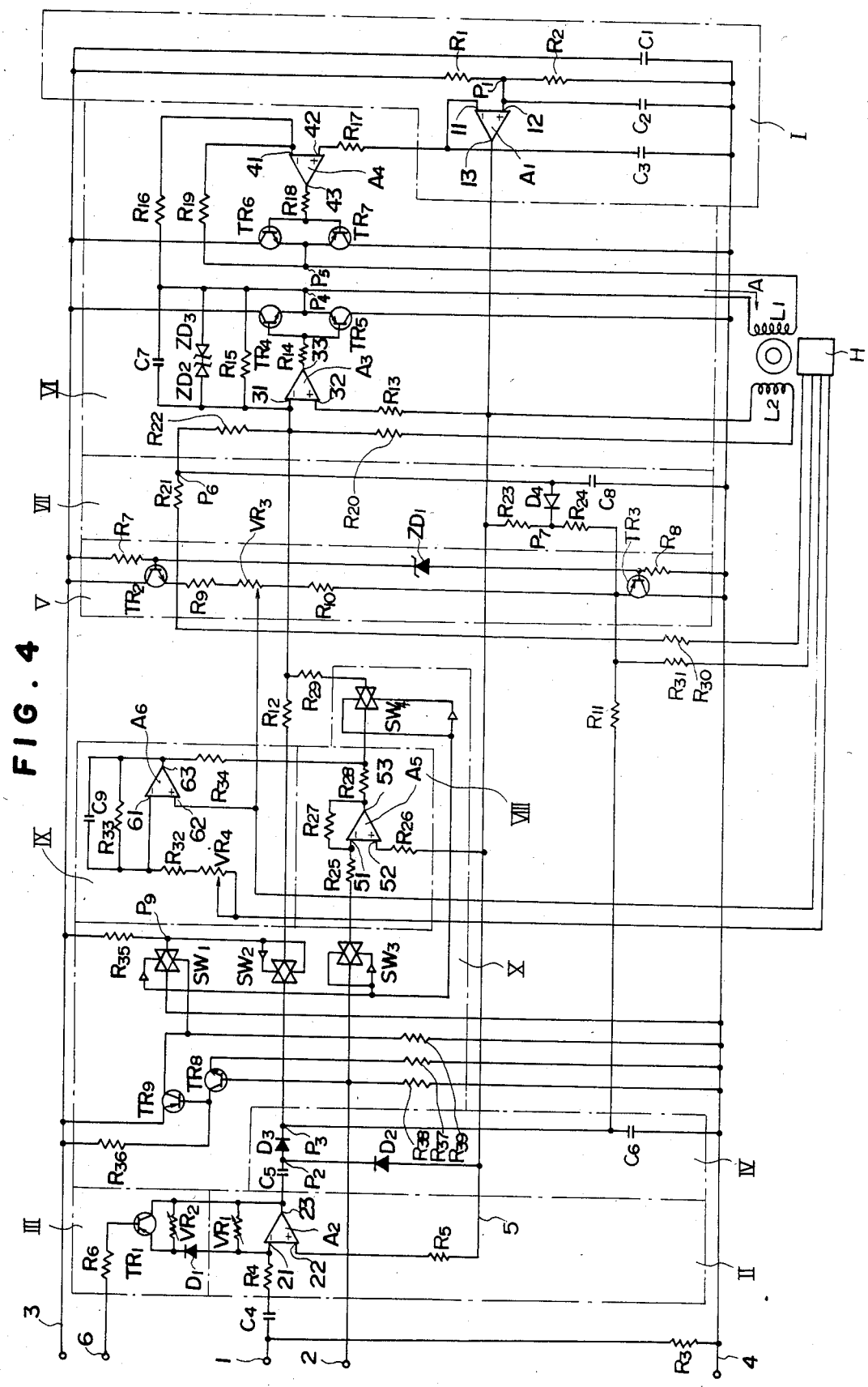
FIG. 4 is a circuit diagram illustrating an embodiment of the device constructed according to the presnet invention.

The device constructed according to the principle of the present invention as has been described hereinabove will be considered in details with reference to an embodiment thereof. In the electric circuit diaphragm of FIG. 4, reference numeral 1 designates a video signal input terminal, reference numeral 2 designates a position control signal input terminal, reference numeral 3 designates a positive voltage side of a source circuit adapted to energize the circuit arrangement of the present invention, reference numeral 4 designates a ground side of said source circuit and reference numeral 5 designates a diddle point voltage terminal destined to supply a middle point voltage.

Reference numeral I designates a middle point voltage supply circuit connected to said source circuit as a component of means functioning to stabilize the diaphragm control signal relative to a source voltage and adapted to supply an intermediate (preferably ½) voltage VO with respect to said source voltage Vc to said middle point voltage terminal 5. In this particular embodiment, a smoothing capacitor C1 and serial resistances R1, R2 both having a same resistance value are connected in parallel to one another between the positive voltage side 3 and the ground side 4, a junction P1 of said resistances R1, R2 being connected to a non-inverting input terminal 11 being directly connected to an output terminal 13 and said non-inverting input terminal 12 and said output terminal 13 being connected respectively via capacitors C2, C3 to the ground side 4 so that the voltage VO equal to ½ of the source voltage Vc appears at the middle point voltage terminal 5.

The video signal input terminal 1 is connected via a resistance R3 to the ground side 4, on one side, and connected via a capacitor C4 to an inverting amplifier II constituting first means of the present invention, on the other side.

Figure 5:
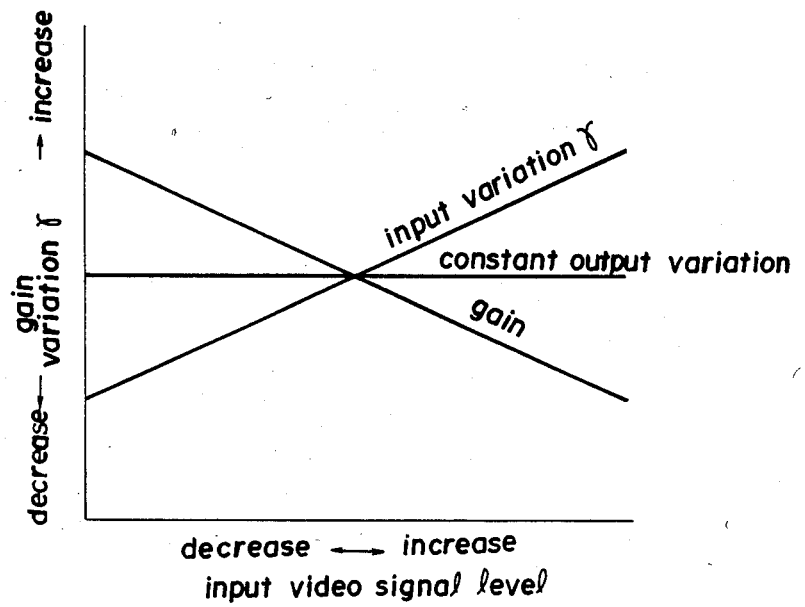
FIG. 5 is a diagram illustrating an effect of sensitivity adjustment in order to control the absolute brightness of an object to be picked up.

In the inverting amplifier II, an inverting input terminal 21 of an operational amplifier A2 and said capacitor C4 are connected to each other via a resistance R4 while a non-inverting input terminal 22 of said operational amplifier and the middle point voltage terminal 5 are connected to each other via a resistance R5, and there is provided between the inverting input terminal 21 and an output terminal 23 a variable resistance VR1 functioning as a feedback resistance. The inverting amplifier II is adapted to invert and to amplify the video signal Vin of which the DC component has been removed in said capacitor C4 so as to produce on its output terminal 23 an inverted signal Vac. The most important function of this inverting amplifier II as the first means of the present invention lies in that the variable resistance VR1 may be regulated to adjust an amplification degree of the operational amplifier A2 in a continuous manner. More specifically, the amplification degree increases as the resistance value of the variable resistance VR1 becomes higher and the amplification degree decreases as said resistance value becomes lower. Referring to FIG. 5, in response to, for example, the video signal corresponding to the optimum picture, and, therefore, the input video signal Vin coming from the camera being relatively high, the input variation γ increases. In such a situation, the inverting amplifier II as the first means of the present invention is adapted to obtain the inversely amplified signal Vac with a constant output variation by the sensitivity adjustment such that the resistance value is reduced to obtain an appropriately reduced amplification degree. When the input variation γ of the video signal Vin is too small, the sensitivity adjustment may be made so that the resistance value is increased to obtain an appropriately increased amplification degree.

Figure 6:
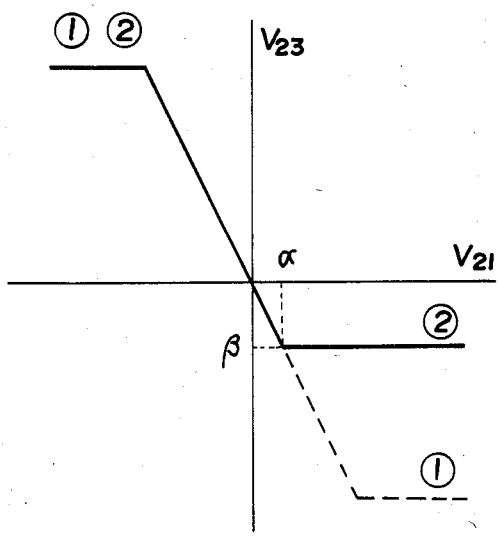
FIG. 6 is a diagram illustrating characteristics of a limiter circuit adapted to control a video signal corresponding to a bright area in an object to be picked up.

Reference numeral III designates a limiter circuit adapted to limit a negative side output (i.e., video signal output corresponding to a bright area in the object) of the video signal inversely amplified by the operational amplifier A2, constituting second means of the present invention. The limiter circuit III is connected in parallel to said variable resistance VR1 and consists of a diode D1, a variable resistance VR2 destined to control electric current flowing through said diode D1, and a switching transistor TR1, in which the inverting input terminal 21 of the operational amplifier A2 is connected to an anode of the diode D1 of which the cathode is connected via the variable resistance VR2 to the output terminal 23. For a remote manipulation, there is provided in parallel to said variable resistance VR2 said transistor TR1 of which the base is connected via a resistance R6 to a remote terminal 6. This limiter circuit III is arranged, as shown by solid line ② in FIG. 6, so that the negative side of the output voltage from the operational amplifier A2 has input/output characteristics forcibly suppressed by the diode. Referring to FIG. 6, the abscissa represents an input voltage V21 at the inverting input terminal 21 of the operational amplifier A2 and the ordinate represents the output voltage V23 at the output terminal 23. FIG. 6 indicates that the output voltage V23 is maintained constant at β under the effect of the limiter circuit when the input voltage V21 is higher than α. Broken line ① corresponds to normal characteristics free from any limitation.

Reference numeral IV designates a rectifier adapted for voltage doubling rectification of the inverted signal Vac obtained in said inverting amplifier II, consisting of a voltage doubling capacitor C5 connected to the output terminal 23 of said operational amplifier A2 and a diode D2 via which an output terminal P2 of said capacitor C5 is connected to the middle point voltage terminal 6. A diode D3 is forwardly connected to the output terminal P2 of said capacitor C5 so that a rectified signal Vdc appears on an output terminal P3. Reference numeral C6 designates a capacitor adapted to smooth said rectified signal Vdc. In this embodiment, the automatic control circuit is constituted from the inverting amplifier II, the limiter III and the voltage doubling rectifier IV as has been set forth above.

Reference numeral V designates a stabilizer adapted to stabilize said rectified signal Vdc relative to the source voltage and constituting fifth means of the present invention. The stabilizer corresponds to a circuit established by a resistance R7, a Zener diode ZD1 and a resistance R8 successively connected in this order between the positive voltage side 3 and the ground side 4 of the source circuit. Base terminals of current amplifying transistors TR2, TR3 are connected between said resistance R7 and said Zener diode and between said Zener diode ZD1 and said resistance R8, respectively. Collector terminal of said transistor TR2 is connected to the positive voltage side of said source circuit, emitter terminal thereof is connected via a resistance R9, a variable resistance VR3 and a resistance R10 to emitter terminal of the transistor TR3, and collector terminal of the latter is earthed to the ground side 4. Emitter terminal of the transistor TR3 is connected via a resistance R11 to an output terminal P3 of the voltage doubling rectifier IV so that the rectified signal Vdc is level-shifted towards the negative side by a predetermined voltage and a behaviour range of said rectified signal Vdc covers both the positive side and the negative side of the middle point voltage VO.

This stabilizer V continues, during the remote control, to supply a power for stabilization of the voltage to drive the position detector element in order to prevent the diaphragm from being affected by a variation in the source voltage.

Reference numeral VI designates a diaphragm drive circuit adapted to compare the rectified signal Vdc from the voltage doubling rectifier IV with the middle point voltage and to drive the diaphragm in accordance with a result of the comparison. In the diaphragm drive circuit IV, an inverting input terminal 31 of an operational amplifier A3 is connected via a switch Sw2 and a resistance R12 to the output terminal P3 of the voltage doubling rectifier IV while a non-inverting input terminal 32 is connected via a resistance R13 to the middle point voltage terminal 5, and an output terminal 33 is connected via a resistance R14 to bases of the transistors TR4, TR5. The transistor TR4 functions as a switching element adapted to become conductive when its base voltage exceeds a predetermined value while the transistor TR5 functions as a switching element adapted to become conductive when its base voltage drops beyond the predetermined value. The transistor TR4 has its collector terminal connected to the positive side 3 of the source circuit and its emitter terminal connected to the emitter terminal of the transistor TR5. The transistor TR5 has its collector terminal connected to the ground side 4. To eliminate non-responsive ranges of these switching transistors TR4, TR5, there is provided between the emitter terminal P4 and the inverting input terminal 31 a feedback resistance R15 in parallel to which a pair of opposing Zener diodes ZD2, ZD3 and a capacitor C7 are connected.

Said emitter terminal P4 is connected via a resistance R16 to an inverting input terminal 41 of an operational amplifier A4, a non-inverting input terminal 42 is connected via a resistance R17 to the middle point voltage terminal 5, and an output terminal 43 is connected via a resistance R18 to the bases of transistors TR6, TR7. The transistor TR6 has its collector terminal connected to the positive side 3 of the source circuit and its emitter terminal connected to the emitter terminal of the transistor TR7. The transistor TR7 has its collector terminal connected to the ground side 4. To eliminate non-responsive ranges of these switching transistors TR6, TR7, there is provided between the emitter terminal P5 and the inverting input terminal 41 of the operational amplifier A4 a feedback resistance R19.

Between said both emitter terminals P4, P5 there is provided a diaphragm driving coil L1 functioning as the motor M adapted to open the diaphragm when the current flows in the direction as indicated by an arrow A. Further, there is provided between the inverting input terminal 31 of the operational amplifier A3 and the middle point voltage terminal 5 a braking coil L2 functioning to control a velocity of the diaphragm by means of a serial resistance R20 and this braking coil L2 is provided in the form of the tachogenerator TG.

Reference numeral VII designates a temperature compensator to protect the picture quality against possible influences of thermal characteristics of circuit components such as the diodes as the ambient temperature varies. This temperature compensator VII has an arrangement in which the emitter terminal of the current amplifying transistor TR2 in the stabilizer V is connected via serial resistances R21, R22 to the inverting input terminal 31 of the operational amplifier A3, on one side, the middle point voltage terminal 5 is connected via serial resistances R23, R24 to the emitter terminal of the current amplifying transistor TR3 in the stabilizer V, on the other side, and the middle point P6 of said serial resistances R21, R22 is connected via a diode D4 to the middle point P7 of said serial resistances R23, R24, and said middle point P7 is earthed via a capacitor C8 to the ground side 4.

Reference numeral VIII designates a position control signal inverter which inverts and amplifies the position control signal Vm applied from the position control signal input terminal 2. In this position control signal inverter VIII, said position control signal input terminal 2 is connected via a switch Sw3 and a resistance R25 to an inverting input terminal 51 of an operational amplifier A5, a non-inverting input terminal 52 is connected via a resistance R26 to the middle point voltage terminal 5, and there is provided between said inverting input terminal 51 and an output terminal 53 a feedback resistance R27. The output terminal 53 of the inverter VIII is connected via a resistance R28, a switch Sw4 and a resistance R29 to the inverting input terminal 31 of the operational amplifier A3 associated with the driver circuit VI so that the diaphragm may be driven with an inverted signal corresponding to the position control signal Vm.

Reference numeral IX designates a detective amplifier which detects a diaphragm position in the remote control mode and electrically fixes the diaphragm under a feedback based on the detection signal. In the embodiment, a Hall effect element of two input/two output is adopted as a diaphragm position detector element H. Input voltage of said Hall effect element H is supplied from the stabilizer V. One input (of positive side) is applied through a resistance R30 from the emitter terminal of the current amplifying transistor TR2 while the other input (of negative side) is applied through a resistance R31 from the emitter terminal of the transistor TR3. One output terminal of the Hall effect element H is connected via a variable resistance VR4 and a resistance R32 to an inverting input terminal 61 of an operational amplifier A6 while the other output terminal is connected to a noninverting input terminal 62 of the operational amplifier A6. To accomodate a variation in the output signal due to a possible unevenness and/or a possible deviation in mounting location of the position detector element, it is arranged so that such variation may be compensated by adjustably connecting the variable terminal of the variable resistance VR3 to the non-inverting input terminal 62 of the operational amplifier A6. Between the output terminal 63 and the inverting input terminal 61 of the operational amplifier A6, there is provided a feedback resistance R33 in parallel to which a capacitor C9 is connected. The output terminal 63 of this operational amplifier A6 is connected via a resistance R34 to a point P8 of the position control signal inverter VIII so that the detection signal obtained at said output terminal 63 may be fed back to the position control signal. The remote control circuit consists of said inverter VIII and said detective amplifier IX.

Reference numeral X designates a switching circuit for changeover between the automatic control mode and the remote control mode. In this switching circuit X, Sw1, Sw2, Sw3, Sw4 represent analog switches adapted to be activated with a predetermined impression voltage, among which the switch Sw2 reversely functions, i.e., when the switch Sw2 is ON, the rest switches are OFF and when the switch Sw2 is OFF, the rest switches are ON. The switch Sw1 is the one which reversely activates the switch Sw2 and in a section comprising a resistance R35 via which the positive voltage side 3 is connected to the ground side 4 of the source circuit, establishes conduction or interception between a point P9 and the ground side 4 so as to vary the impression voltage of the switch Sw2. The switch Sw2 is adapted to establish conduction or interception between the output terminal P3 of the rectifier IV and the driver VI, the switch Sw3 is adapted to establish conduction or interception between the position control signal input terminal 2 and the input terminal 51 of the inverter VIII, and the switch Sw4 is adapted to establish conduction or interception between the point P8 of the inverter VIII and the input terminal 31 of the driver VI. To apply the respective analog switches with the impression voltage, the positive voltage side 3 and the ground side 4 of the source circuit are connected to each other via a resistance R36, a switching transistor TR8 and a resistance R37, the base terminal of said transistor TR8 is connected to the position control signal input terminal 2 and earthed via a resistance R38. The positive voltage side 3 and the ground side 4 are connected to each other also via another switching transistor TR9 and a resistance R39 and the base terminal of said transistor TR9 is connected to the collector terminal of said transistor TR8. The switches Sw1, Sw3, Sw4 are applied with the impression voltage from the collector terminal of said transistor TR9 while the switch Sw2 is applied with the impression voltage via the resistance R35 and the point P9 from the positive voltage side 3 of the source circuit.

The embodiment of the present invention of the arrangement as has been described hereinabove functions as follows:

So long as the position control signal input terminal 2 is applied with no position control signal Vm higher than a predetermined reference voltage, the transistor TR8 has its base potential being earthed and the collector-emitter section being OFF while the transistor TR9 has its base potential being equal to the source voltage and the collector-emitter section being OFF. In consequence, the collector terminal of the transistor TR9 takes a potential O, the switches Sw1, Sw3, Sw4 are OFF, the point P7 takes a potential euqal to the source voltage and the switch Sw2 is ON. Thus, the device according to the present invention functions, in this condition, as the automatic control circuit utilizing the video signal.

Figure 7:
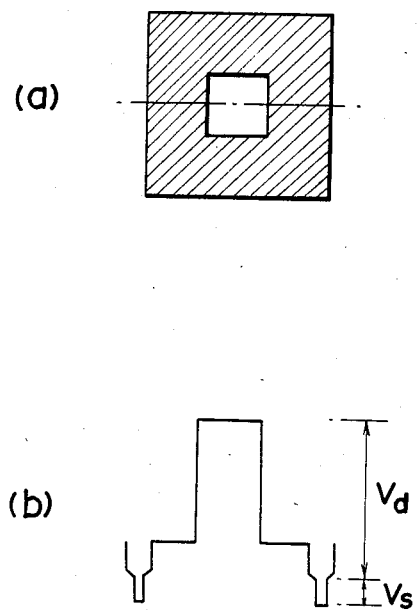
FIG. 7 illustrates a relationship between an object to be picked up and a video signal.
Figure 8:
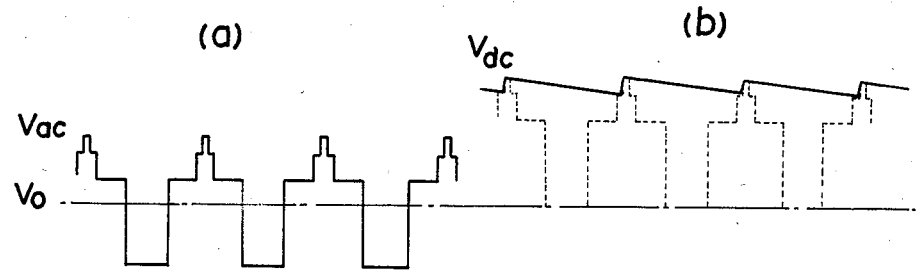
FIGS. 8 through 10 schematically illustrate output waveforms at respective circuit stages in relation to input signal waveforms.

Assumed that the video signal input terminal 1 is applied, as illustrated by the test chart of FIG. 7(a), with a video signal Vin of a waveform as shown by FIG. 7(b). In this waveform, a rectangular area on the positive side corresponds to a bright area in the picture, Vd and Vs represent a video level and a synchronous level, respectively. This video signal Vin is inversely amplified by the inverting amplifier II as shown by FIG. 8(a) and an inverted signal Vac appears on the output terminal 23 of said inverting amplifier II. This inverted signal Vac has its DC component eliminated by the capacitor C4 and, as a result, is in a steady state, i.e., the inverted signal Vac has positive and negative areas which are equal to each other with respect to the middle point voltage VO. The amplification degree of the inverting amplifier II increases as the variable resistance VR1 is regulated to increase its resistance value and decreases as said variable resistance VR1 is regulated to reduce its resistance value. By regulating the amplification degree in this manner, the amplification degree may be reduced when the video signal Vin coming from the television camera is too high and increased when the video signal Vin is too low. Thereby a desired sensitivity adjustment is achieved to obtain a diaphragm control signal providing the optimum picture.

Adjustment of the variable resistance VR2 associated with the limiter III or input of a remote voltage to the remote terminal 6 permits The control mode to be adjusted depending on a ratio of brightness and darkness as in the natural world, in which mode a brighter area should be selected as a main object to be picked up or a darker area should be selected as a main object to be picked up.

When the variable resistance VR2 takes its resistance value infinite, the inverted signal Vac takes a waveform corresponding to an inverted video signal Vin as seen in FIG. 8(a), since then the limiter III is not activated. Input of this inverted signal Vac to the capacitor C5 of the voltage doubling rectifier IV causes a negative portion of the inverted signal Vac to turn the diode D2 on, initiating the capacitor C5 to be charged, and a subsequent positive portion is added to the previously charged voltage. Thus, a voltage doubled signal VP2 appearing on the point P2 is DC-regenerated as the DC voltage having the amplitude as seen in FIG. 8(b). Thus, the voltage doubled signal VP2 of the initial amplitude is obtained, so the mode of light measuring is set to the mode in which the video level Vd is detected and the brighter area is selected as the main object to be picked up.

Figure 9:
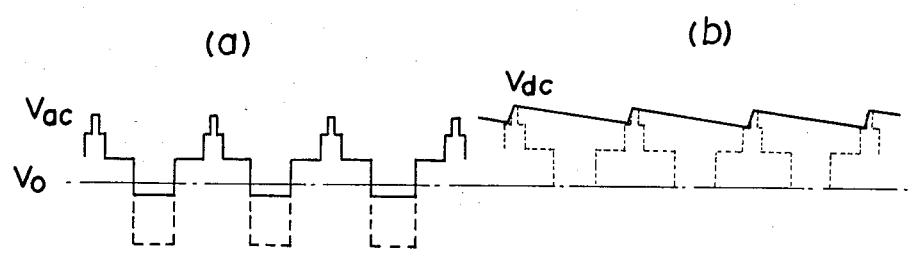

In the case where the resistance value of the variable resistance VR2 in the limiter III is adjusted to O, the diode D1 becomes conductive and the operational amplifier A2 is subjected to the limitation as shown in FIG. 6. More specifically, when the video signal Vin passes through the capacitor C4 and applied to the inverting amplifier II, the brighter area is clipped and the inverted signal Vac having no portion indicated by a broken line is formed, as seen in FIG. 9(a). Rectification of this inverted signal Vac by the voltage doubling rectifier IV results in a DC regeneration as shown by FIG. 9(b) in the same manner as in the previously mentioned control mode. That is, the voltage doubled signal VP2 is determined not by the amplitude of the video signal Vin but a value substantially corresponding to an average value of the whole area of the object to be picked up having its negative portion of the signal clipped away. The above-mentioned operation is the average light measuring control mode in which the darker area is used as the main object to be picked up. By adjusting said variable resistance VR2 to an intermediate resistance value, the light measuring mode is converted to a mode intermediate of said two light measuring modes. Input of the remote voltage to the remote terminal 6 causes the switching transistor TR1 to be turned ON and the diode D1 to become conductive, subjecting the operational amplifier A2 to limitation. Thus, it is possible by utilizing the remote terminal 6 to control whether the brighter area should be selected or the darker area should be selected as the main object to be picked up.

Figure 10:
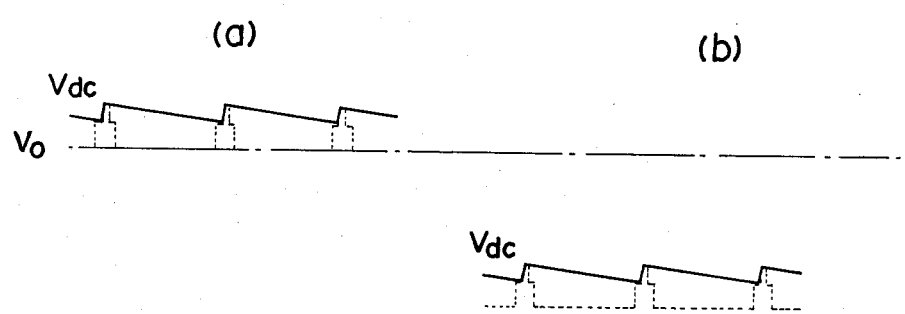

The rectified signal Vdc which has passed through said voltage doubling rectifier IV corresponds to the voltage doulbed signal VP2, but the video signal Vin originally involves the synchronous level Vs so that the rectified signal Vdc is on the positive side with respect to the middle point voltage VO as seen in FIG. 10(a), even when the object is of the darkest condition. However, the device of the present invention should be activated on both sides of the middle point voltage VO. To achieve this, the present invention provides a unique adjustment such that the rectified signal is lowered by a predetermined voltage towards the negative side to make the video signal corresponding to the darker object negative with respect to the middle point voltage VO. Thus, the rectified signal Vdc will have its waveform on the negative side as seen in FIG. 10(b), i.e., a darker video signal Vin will surely be lower than the middle point voltage VO. In this way, the rectified signal Vdc can have its same ranges of behaviour both on the positive side and on the negative side with respect to the middle point voltage VO.

This rectified signal Vdc is applied to the inverting input terminal 31 of the operational amplifier A3. Upon this application, the input voltage V31 (Vdc) will have a level corresponding to the reference voltage and the output voltage V33 =VO for the optimum picture condition, so that both the transistors TR4, TR5 are not activated and, therefore, no current flows through the driving coil L1.

For a relatively bright object to be picked up, i.e., when the input voltage V31<VO, this input voltage V31 is inversely amplified by the operational amplifier A3 with respect to the middle point voltage into the output voltage V33<VO. As a result, the collector-emitter section of the transistor TR5 is now conductive and the voltage VP4<VO appears on the emitter terminal P4. When this voltage VP4 is inversely amplified again by the operational amplifier A4 with respect to the middle point voltage VO and the output voltage V43<VO appears on the output terminal 42 of said operational amplifier A4, the collector-emitter section of the transistor TR6 becomes conductive. Once the transistors TR5, TR6 have been turned to their conductive states in this manner, the current flows in the direction opposed to that as indicated by an arrow A from the positive voltage side 3 of the source circuit through the transistor TR6 to the diaphragm driving coil L1 which is, in turn, activated to close the diaphragm.

For a relatively dark object to be picked up, on the contrary, i.e., in the case of the input voltage V31<VO, this input voltage V31 is inversely amplified by the operational amplifier A3 with respect to the middle point voltage VO to produce the output voltage V33>VO on the output terminal 33 of said operational amplifier A3 and the collector-emitter section of the transistor TR4 becomes conductive, producing the voltage VP4>VO on the emitter terminal P4. When this voltage VP4 is inversely amplified again by the operational amplifier A4, the output voltage V43>VO appears on the output terminal 43 of this operational amplifier A4 and the collector-emitter section of the transistor TR7 becomes conductive. Once the transistors TR4, TR7 have become conductive in this manner, the current flows in the direction as indicated by said arrow A from the positive voltage side 3 of the source circuit through the transistor TR4 to the diaphragm driving coil L1 which is, in turn, activated to open the diaphragm.

Such closing and opening movement of the diaphragm induces an electromotive force in the braking coil L2 and this electromotive force may be fed back to the inverting input terminal 31 of the operational amplifier A3 to prevent the diaphragm from oscillating and thereby to maintain the closing and opening movement at a constant velocity.

The manner in which the device according to the present invention operates in the automatic control mode has been described hereinabove. Now the manner of operation in the remote control mode will be described.

When the position control signal Vm applied to the position control signal input terminal 2 exceeds the reference voltage, the collector-emitter sections of the respective transistors TR8, TR9 become conductive and the switches Sw1, Sw3, Sw4 are turned ON, since these switches are then applied with the impression voltage. Turning of the switch Sw1 ON causes P7 to be earthed and, as a result, the switch Sw2 is turned OFF. Thus, the automatic control circuit utilizing the video signal Vin is now intercepted and the remote control circuit utilizing the position control signal Vm is established.

The position control signal Vm applied to the position control signal input terminal 2 is inversely amplified in the inverter VIII with respect to the middle point voltage VO.

In response to the position control signal Vm applied to the position control signal input terminal 2, the output voltage V53= −Vm appears on the output terminal of the operational amplifier A5 and the output signal of the Hall effect element H is amplified by the operational amplifier A6 in the detective amplifier IX to produce the detection signal Vh on the output terminal 63 of said operational amplifier A6. These −Vm and Vh are applied to the driver circuit VI so as to drive the diaphragm until a relation Vh+(−Vm)=VO is established.

In the case of the position control signal Vm>Vh, the transistors TR4, TR7 become conductive in the driver circuit VI and the diaphragm is driven to open until Vm=Vh is established.

In the case of the position control signal Vm<Vh, the transistors TR5, TR6 become conductive in the driver circuit VI and the diaphragm is driven to close until Vm=Vh is established.

With the diaphragm control device for the CCTV camera, as will be obviously understood from the aforegoing description, there are provided automatic diaphragm control means for diaphragm control utilizing a video signal coming from the television camera and remote diaphragm control means, the former permitting the diaphragm to be continuously regulated with respect to the absolute brightness and the light/shade ratio (contrast) of an object to be picked up, the latter permitting the diaphragm to be electrically adjusted to a desired diaphragm position independently of said video signal, wherein a changeover between said automatic diaphragm control means and said remote diaphragm control means as well as the remote control itself can be easily achieved from a remote place when a level of the position control signal voltage is made variable with respect to a predetermined reference voltage under a single-wire control. Furthermore, the control signal obtained and the detection signal fed back from the position detector element in said remote diaphragm control means are stabilized with respect to the source voltage so that the diaphragm value once adjusted under a given source voltage can be held constant. Thus the present invention provides a diaphragm control device for the CCTV camera, which is useful in various applications and extremely reliable. This is very significant in view of a fact that the CCTV system is expected to find more extensive and more various fields of application in a future.

What is claimed is:

1. A remote-controllable automatic diaphragm control device for use with a CCTV camera including not only automatic diaphragm control means adapted for diaphragm control utilizing a video signal coming from a television camera but also remote diaphragm control means adapted for electrical adjustment of the diaphragm to a desired diaphragm position independently of said video signal, said diaphragm control device comprising:

a driver circuit adapted to drive a diaphragm drive motor to open and close the diaphragm;

an automatic control circuit to apply said driver circuit with a control signal based on the video signal coming from the television camera;

first means provided in said automatic control circuit for continuous control of the video signal with respect to an absolute brightness of an object to be picked up;

second means provided in said automatic control circuit for continuous control of a proportion of the video signal corresponding to a bright area in the whole picture when a ratio of the bright area to a dark area of this object is relatively high;

a remote control circuit to apply said driver circuit with a diaphragm position control signal exclusively for the remote diaphragm control;

a position feedback circuit to detect a position to which the diaphragm has been driven by the diaphragm drive motor and thereby to electrically fix the diaphragm;

a switching circuit for selective connection of said automatic control circuit or said remote control circuit to said driver circuit depending on the position control signal applied to said remote control circuit whether it is higher or lower than a predetermined reference voltage and further for connection of said position feedback circuit to the driver circuit only when said driver circuit is connected to the remote control circuit; and a stabilizer for stabilization of a control signal obtained by said automatic diaphragm control means and a detection signal fed back from a position detector element in said remote diaphragm control means with respect to a source voltage so that the diaphragm value once adjusted under a given source voltage may be held constant.

2. An automatic diaphragm control device for use with a CCTV camera according to claim 1, wherein said first means comprises an inverting amplifier adapted for amplification degree variable inverse amplification of the video signal coming from the television camera in such a manner that a uniform input/output characteristic is maintained by reducing the amplification degree when the video signal coming from the television camera is at a high level and by increasing the amplification degree when the video signal coming from the television camera is at a low level.

3. An automatic diaphragm control device for use with a CCTV camera according to claim 1, wherein said second means can be continuously controlled at will adjacently to or remotely from the camera lens itself.

4. An automatic diaphragm control device for use with a CCTV camera according to claim 1, wherein said switching circuit changes over from the remote diaphragm control circuit to the automatic diaphragm control circuit for said position control signal voltage being lower than the predetermined reference voltage and from the automatic diaphragm control circuit to the remote diaphragm control circuit for said position control signal voltage being higher than the predetermined reference voltage.

5. An automatic diaphragm control device for use with a CCTV camera according to claim 1, wherein said driver circuit drives the diaphragm drive motor to open the diaphragm as the position control signal voltage applied to the remote control circuit rises and to close the diaphragm as the position control signal voltage applied to the remote control circuit drops, when said position control signal voltage is higher than the predetermined reference voltage.

6. An automatic diaphragm control device for use with a CCTV camera according to claim 1, further comprising:

a source of said position control signal, said source being at a voltage regulated within a range of voltage higher than the predetermined reference voltage;

a single-wire line connecting said source to the remote control circuit; and a switch provided in said single-wire line, and wherein the automatic diaphragm control means is constituted when said switch is OFF and the remote diaphragm control means is constituted when said switch is ON.

* * * * *